(12) United States Patent
Takeshita

(10) Patent No.: US 7,423,674 B2
(45) Date of Patent: Sep. 9, 2008

(54) ELECTRONIC CAMERA HAVING COLOR ADJUSTMENT FUNCTION AND PROGRAM THEREFOR

(75) Inventor: Tetsuya Takeshita, Yokohama (JP)

(73) Assignee: Nikon Corporation, Tokyo (JP)

( * ) Notice: Subject to any disclaimer, the term of this patent is extended or adjusted under 35 U.S.C. 154(b) by 374 days.

(21) Appl. No.: 11/118,382

(22) Filed: May 2, 2005

(65) Prior Publication Data

US 2005/0195290 A1    Sep. 8, 2005

Related U.S. Application Data

(63) Continuation-in-part of application No. 10/994,404, filed on Nov. 23, 2004.

(30) Foreign Application Priority Data

| Dec. 8, 2003 | (JP) | 2003-409055 |
| Apr. 23, 2004 | (JP) | 2004-128721 |
| Aug. 16, 2004 | (JP) | 2004-236348 |

(51) Int. Cl.
H04N 9/73    (2006.01)

(52) U.S. Cl. .......... 348/223.1; 348/224.1; 348/225.1

(58) Field of Classification Search .......... 348/224.1, 348/223.1, 655, 225.1, 672; 358/516
See application file for complete search history.

(56) References Cited

U.S. PATENT DOCUMENTS

| 5,001,552 A | * | 3/1991 | Okino | 348/224.1 |
| 5,568,194 A | | 10/1996 | Abe | |
| 6,075,562 A | * | 6/2000 | Sakaguchi et al. | 348/223.1 |
| 6,151,073 A | * | 11/2000 | Steinberg et al. | 348/371 |
| 6,195,127 B1 | * | 2/2001 | Sugimoto | 348/370 |
| 6,493,468 B1 | * | 12/2002 | Matsuura | 382/274 |
| 2003/0058357 A1 | * | 3/2003 | Aotsuka | 348/272 |
| 2006/0182338 A1 | * | 8/2006 | Toyoda et al. | 382/167 |

FOREIGN PATENT DOCUMENTS

| JP | A 8-051632 | 2/1996 |
| JP | A 2003-264850 | 9/2003 |

* cited by examiner

*Primary Examiner*—David Ometz
*Assistant Examiner*—Wanda M Negron
(74) *Attorney, Agent, or Firm*—Oliff & Berridge, PLC

(57) ABSTRACT

An electronic camera controls an imaging section to generate a test image without flash and a main image with flash. Then, the electronic camera judges correlation between histogram distributions of the test image and the main image. If the correlation between the histogram distributions is low, the electronic camera judges that the flash illumination is uneven and performs white balance adjustments, placing greater importance on the color temperature of the flash. Conversely, if the correlation between the histogram distributions is high, the electronic camera judges that the flash illumination is uniform and performs white balance adjustments, placing greater importance on the color temperature of the main image.

21 Claims, 9 Drawing Sheets

FIG. 4

| LUMINANCE COMPONENT RANGE | 5-30 | 31-55 | 56-80 | 81-105 | 106-130 | 131-155 | 156-180 | 181-205 | 206-230 | 231-255 |
|---|---|---|---|---|---|---|---|---|---|---|
| HISTOGRAM A WITHOUT FLASH =Ni | 0 | 10 | 15 | 30 | 10 | 20 | 10 | 50 | 8 | 7 |
| HISTOGRAM B WITH FLASH =Mi | 0 | 5 | 20 | 50 | 30 | 20 | 10 | 20 | 7 | 3 |

FIG. 5

| EUCLID DISTANCE D BETWEEN HISTOGRAMS (CORRELATION VALUE) | WEIGHTS | |
|---|---|---|
| | FIRST WHITE BALANCE ADJUSTMENT VALUE FOR COLOR TEMPERATURE OF FLASH | SECOND WHITE BALANCE ADJUSTMENT VALUE FOR COLOR TEMPERATURE OF MAIN IMAGE |
| 0 | 0 | 100 |
| 10 | 10 | 90 |
| 20 | 25 | 75 |
| 30 | 40 | 60 |
| 40 | 50 | 50 |
| 50 | 60 | 40 |
| 60 | 75 | 25 |
| 70 | 90 | 10 |
| 80 | 100 | 0 |

ELECTRONIC CAMERA HAVING COLOR ADJUSTMENT FUNCTION AND PROGRAM THEREFOR

CROSS REFERENCE TO RELATED APPLICATIONS

This application is a continuation-in part application of U.S. patent application Ser. No. 10/994,404, filed Nov. 23, 2004, and claims the benefit of priority from Japanese Patent Application No. 2003-409055, filed on Dec. 8, 2003, No. 2004-128721, filed on Apr. 23, 2004, and No. 2004-236348, filed on Aug. 16, 2004, the entire contents of which are incorporated herein by reference.

BACKGROUND OF THE INVENTION

1. Field of the Invention

The present invention relates to an electronic camera that performs color adjustments on a shot image as well as to a program for causing a computer to perform color adjustments.

2. Description of the Related Art (Illumination Unevenness of a Flash)

In typical shooting with flash, an object is illuminated with complex light that is a mixture of a flash that is emitted from an electronic flash device and ambient light such as sunlight or light from street lamps. The ratio between the flash illumination and the ambient light illumination varies in a complex manner depending on the distance to the object, the angle of the object, and other factors. Therefore, the color temperature of such mixed light varies greatly depending on the position in a frame.

For example, if a human object is shot with flash and with evening sunlight as backlight, it is mainly illuminated with flash. As a result, the human object exhibits a high color temperature (e.g., 5,000 K) of the flash. On the other hand, illuminated with evening sunlight, the background exhibits a low color temperature (e.g., 3,000 K).

Such color temperature unevenness in the same frame makes it very difficult to perform proper white balance adjustments.

Japanese Unexamined Patent Application Publication No. Hei 8-051632 (hereinafter referred to as Reference 1) discloses an apparatus that performs white balance adjustments during flash shooting while dealing with the above problem.

This conventional apparatus makes preliminary shooting without flash and main shooting with flash. Then, it calculates a luminance difference on a pixel-by-pixel basis between the two shot images. A region with a large luminance difference corresponds to a portion of an object that was illuminated brightly with a flash, and exhibits a high color temperature. On the other hand, a region with a small luminance difference is less affected by the flash and exhibits a low color temperature of ambient light.

In view of the above, the conventional apparatus performs white balance adjustment for flash shooting on image regions having large luminance differences; on the contrary, it performs white balance adjustment for shooting with ambient light on image regions having small luminance differences. It performs white balance adjustment for medium light between the flash and the ambient light on regions having medium luminance differences. Thus, the conventional apparatus calculates a pixel-based luminance variation that is caused by illumination/non-illumination with a flash and judges influences of the flash on the basis of magnitudes of the luminance variation.

However, the conventional apparatus cannot obtain an image captured with flash and an image captured without flash at the same time; the two images are always generated with a time difference. If an object moves or a camera shake occurs during this interval, the shot images do not completely coincide with each other in patterns. Such pattern deviations also cause the above-described luminance differences.

Therefore, for an object that moves at high speed in a frame, it is difficult to judge influences of a flash on the basis of luminance differences between two kinds of images and it is impossible to perform proper white balance adjustments.

In other words, to avoid the problem of the conventional apparatus, the object has to be stationary or the electronic camera need be fixed to a tripod, for example. Therefore, use of the conventional apparatus leads to limiting subjects or ways of shooting.

Further, in Reference 1, to correctly measure luminance differences due to presence/absence of flash emission, it is necessary to shoot without flash and with flash under the same exposure conditions (e.g., same aperture number, same imaging sensitivity, and same charge storage time). Therefore, in flash shooting taking many seconds such as slow synchronous shooting, shooting without flash has to also be performed for many seconds. In this case a delay of a main flash shooting causes a problem of missing a good shooting chance.

In addition, since flash shooting and non-flash is started under the same exposure conditions, it is not possible to change the exposure conditions for the flash shooting halfway through the shooting. Accordingly, it is impossible to change the exposure conditions for the flash shooting in accordance with circumstances, upon analyzing a result of non-flash shooting.

(Unevenness of Illumination by Fluorescent Lamps)

It is also known that a green fog may occur in an image which is shot under illumination with fluorescent lamps because of the wavelength characteristic of the fluorescent lamps.

Japanese Unexamined Patent Application Publication No. 2003-264850 (hereinafter referred to as Reference 2) discloses a technique for correcting such a green fog by white balance adjustments as well as a technique for weakening the green fog correction if the green color of an image is judged green of a plant based on a color analysis.

If the object is illuminated with fluorescent lamps unevenly, a green fog appears only in certain portions of the object and no green fogs appear in other portions that are illuminated with strong light of another kind (e.g., light from a light bulb or a flash).

For example, consider a case that a person is positioned in front of the camera with high-rise buildings (with many fluorescent lamps seen through the windows) in the background, and he/she is illuminated with light from a light bulb, and this scene is shot with slow synchronized shooting with flash of an electronic flash device. In this case, whereas a green fog due to the fluorescent lamps covers the light coming from the high-rise buildings that account for most of the background, almost no green fog covers a region in which the person stands in front of the camera because he/she is illuminated brightly with the light bulb or flash.

With a conventional green fog correction for such an image, a problem arises that an unnatural magenta fog occurs in the image region including the person which is free from the green fog, because the levels of red and blue components of the image region increase.

Heretofore, it has been impossible for an electronic camera to solve this problem automatically by image processing because it cannot judge properly whether green fogs occur in the entire image or only parts of it. That is because by the conventional technique color fogs are detected merely in limited regions of an image such as low-chroma regions. Therefore, it cannot be judged whether detected green fogs cover the entire image.

SUMMARY OF THE INVENTION

An object of the present invention is therefore to realize proper color balance adjustments on image data created by shooting under a complex illumination.

Another object of the invention is to provide a technique for judging influences of illumination unevenness reliably even for a moving object.

Still another object of the invention is to provide a technique for properly judging whether color fogs due to a special light source (e.g., fluorescent lamp) have occurred in the entire image.

A further object of the invention is to provide a technique for properly determining the degree of influence flash emission has even if the exposure conditions for flash shooting and for non-flash shooting are different.

The invention will be summarized below.

(1) An electronic camera according to the invention includes the following imaging section, imaging control section, histogram calculating section, histogram correlation judging section, white balance calculating section, and white balance adjusting section.

The imaging section captures an image of an object. The imaging control section controls the imaging section to generate a test image captured without a flash and a main image captured with a flash.

The histogram calculating section generates respective histogram distributions for the test image and the main image.

The histogram correlation judging section judges correlation between the two histogram distributions.

The white balance calculating section determines a white balance adjustment value, placing importance on a color temperature of a flash, when judging that a flash has not illuminated an object evenly since the correlation is judged low, and determines a white balance adjustment value, placing importance on a color temperature of the main image, when judging that a flash has illuminated an object evenly or a flash has not reached an object evenly since the correlation is judged high.

The white balance adjusting section adjusts a white balance of the main image in accordance with the white balance adjustment value obtained by the white balance calculating section.

In the above operation, it is determined how similar shapes of histogram distributions of a test image and a main image have. It can be judged that more different shapes they have from each other, the more uneven variance in the luminance distribution between the test image and the main image is so that the flash illumination to the object or the reflectance of the objects has been uneven. In other words, it can be judged that the main image contains both regions illuminated brightly with the flash and regions which the flash has not reached.

If a color temperature of the light source is estimated from such a main image, a color temperature not of the image will be output erroneously because uneven color temperatures of the image are averaged. With reference to this erroneous color temperature, improper white balance adjustments will be done to both of the regions well-illuminated with flash and regions not illuminated with flash.

In view of the above, the electronic camera of the invention switches white balance adjustment to one with importance placed on the color temperature of the flash, upon detecting unevenness of flash illumination. This allows good white balance adjustments to be made on image regions illuminated brightly with the flash.

Generally, the user of an electronic camera intends to illuminate a major object brightly with a flash. Therefore, naturally the above-mentioned image regions illuminated brightly with a flash are likely to be a major object in the image. Accordingly, placing greater importance on the color temperature of the flash makes it possible to properly adjust white balance of the major object and to thereby improve the color reproduction performance of the major object.

Conversely, it can be judged that the more similar shapes the histogram distribution of the two images have, the more even the variations in the luminance distribution between the test image and the main image in a frame becomes, so that the object in the frame have been illuminated with the flash almost evenly.

In this case, the electronic camera of the invention performs white balance adjustments, placing greater importance on the color temperature of the main image. Since the object in the frame is illuminated evenly, an estimated color temperature that is obtained with reference to that of the main image well reflects an actual color temperature. As a result, it is made possible to perform proper white balance adjustments on the entire image by placing greater importance on the color temperature of the main image.

As described above, according to the invention, comparing histogram distributions of a test image and a main image makes it possible to accurately estimate the degree of evenness of flash illumination, enabling proper white balance adjustments according to an estimation result.

Further, the invention is advantageous than the conventional technique disclosed in Reference 1 in the following point.

The electronic camera of the invention compares histogram distributions of a test image and a main image. Generally, movement of a major object or a camera shake causes subtle pattern variations between the test image and the main image. However, the histogram distribution of the image hardly varies even if the patterns move subtly.

In the histogram comparison according to the invention, it is unnecessary to consider the pattern variations between the test image and the main image in contrast to the above-mentioned conventional apparatus. As such, even with some object movement or camera shake, the electronic camera of the invention is able to judge the evenness of flash illumination correctly and perform proper white balance adjustments according to a judgment result.

(2) It is preferable that the white balance calculating section calculate, as the white balance adjustment value, a weighted combination value of a first white balance adjustment value and a second white balance adjustment value. The first white balance adjustment value is determined with reference to the color temperature of the flash, and the second white balance adjustment value is determined with reference to the color temperature of the main image. The white balance calculating section increases the weight of the first white balance adjustment value if it is judged that the correlation is low. Conversely, if it is judged that the correlation is high, the white balance calculating section increases the weight of the second white balance adjustment value.

This operation makes it possible to obtain a proper white balance adjustment value even if the illumination distribution of a flash is in-between evenness and unevenness, with the intermediate evenness taken into consideration.

(3) It is preferable that the white balance calculating section determine a frequency of white saturation and/or black saturation in the main image, and refrain from judging the evenness of the flash illumination if the frequency is higher than a predetermined threshold value.

The white saturation and the black saturation occur when the signal levels of a main image changes to nonlinear due to illumination with an excessively strong flash, for example. It is difficult to judge the evenness of flash illumination by comparing such a main image with a test image.

In view of this, the electronic camera according to the invention stop judging the evenness of the flash illumination when the frequency of white saturation and/or black saturation in the main image is higher than a certain threshold value. This makes it possible to substantially lower the occurrence of an erroneous judgment on the evenness of the flash illumination.

(4) It is even preferable that the imaging section include a photometric image sensor for performing an imaging operation for divisional photometry and a recording image sensor for performing an imaging operation for recording. The imaging control section captures the test image without a flash by controlling the photometric image sensor, and captures the main image with a flash by controlling the recording image sensor.

This configuration is particularly suitable for single-lens electronic cameras. Single-lens electronic cameras are equipped with a photometric image sensor for divisional photometry and a recording image sensor for generating a main image for recording.

Among the two image sensors, the photometric image sensor is used for capturing a test image. In general, the photometric image sensor is smaller in the number of pixels and shorter in the time necessary for transfer readout and processing of a shot image than the recording image sensor. Therefore, capturing a test image with the photometric image sensor can make the operation sequence for the test image simpler and faster than capturing a test image separately with the recording image sensor.

(5) It is preferable that the histogram calculating section reduce a difference between the two histogram distributions due to a device difference between the photometric image sensor and the recording image sensor.

For example, the photometric image sensor and the recording image sensor have differences originating from image sensors in the number of pixels of an output image, a gradation, the number of quantization bits, or the like. Reducing such differences realizes more accurate judgment as to the evenness of the flash illumination.

(6) It is even preferable that the histogram correlation judging section detect correlation between the two histogram distributions generated by the histogram calculating section after removing frequencies lower than a predetermined frequency from the two histogram distributions.

For example, it is possible to eliminate low frequencies corresponding to noise from the histogram distributions through the above removal operation. This in turn enables prevention of an erroneous judgment due to noise at the time of the correlation detection of the histogram distributions, thereby realizing more accurate judgment on the evenness of the flash illumination.

It is also possible to remove low frequencies from the histogram distributions so as to keep only high frequencies in the images. In this case, the histogram distributions are compared with each other by extracting only high frequency regions, that is, large-area regions in the same gradation range. It is highly probable that image regions extracted in this manner are conspicuous in the images. Judging the evenness of the flash illumination to these regions means that a judgment as to the evenness of the flash illumination is made with greater importance on conspicuous, large-area regions. As a result, it is able to realize white balance adjustments in accordance with the characteristics of the human vision.

(7) An electronic camera according to another aspect of the invention includes an imaging section, an imaging control section, a histogram calculating section, a histogram correlation judging section, a special light source determining section, and a color balance adjusting section.

The imaging section captures an image of an object. The imaging control section controls the image section to generate a test image captured without a flash and a main image captured with a flash.

The histogram calculating section generates respective histogram distributions for the test image and the main image. The histogram correlation judging section judges correlation between the two histogram distributions.

The special light source determining section detects a green fog due to illumination by a fluorescent lamp, upon determining that chromaticity of a low-chroma region in the main image is separated from the black body locus.

The color balance adjusting section corrects a green fog by increasing red and blue components of the main image relatively to a green component thereof, upon judging that that the fluorescent lamp illumination is even because the histogram correlation is judged high and the green fog is detected in the low-chroma region. The color balance adjusting section weakens the green fog correction, upon judging that the fluorescent lamp illumination is not even because the histogram correlation is judged low and the green fog is detected in the low-chroma region.

Through the above operation, it is able to know occurrence of a green fog in a wide range of the main image due to the fluorescent lamp illumination in a case where a green fog is detected in a part (i.e., a low-chroma region) of the main image in which the illumination is judged even from the histogram correlation. In this case, the green fogs are corrected positively by increasing the red and blue components of the main image relatively to its green component. This results in reliably reducing the green fog occurring in the wide range of the image and acquiring a natural main image with less green fog covering on the entire frame.

On the other hand, if a green fog is detected in a part (i.e., a low-chroma region) of the main image in which the illumination is judged uneven, it is able to know occurrence of a green fog in only a part of the main image. In this case, the above-described green fog correction is weakened. This prevents a problem that magenta fogs might otherwise occur in regions other than the green fog region.

(8) It is even preferable that the color balance adjusting section calculates a weighted combination value of a white balance adjustment value and a color balance adjustment value if a condition that the histogram correlation is low and a green fog is detected is satisfied, and performs a color balance adjustment on the main image by using the weighted combination value.

The above-mentioned white balance adjustment value is determined with reference to a correlation color temperature (i.e., a color temperature obtained by mapping to the black body locus) of the main image. The above-mentioned color balance adjustment value is for the green fog correction.

Green fogs due to illumination by a fluorescent appear such that the color shifts from the black body locus toward green.

Therefore, mapping on the black body locus makes it possible to eliminate the color shift toward green and to thereby obtain a correlation color temperature without being influenced by the green fogs. Using a white balance adjustment value, which is determined with reference to this correlation color temperature, allows proper color reproduction in regions free of the green fogs (in the above-described example, the region corresponding to the major object in front of the camera).

The color balance adjustment value is shifted from its original value to weaken the green fog correction by weighting and combining this white balance adjustment value with the color balance adjustment value for the green fog. This results in reducing the degree of magenta fog that is by-products of the green fog correction. This can also improve the color reproduction performance in the regions that are free of the green fogs since the white balance adjustment value includes the weighted combination value.

(9) It is preferable that for the calculation of the weighted combination value, the color balance adjusting section decrease the weight of the color balance adjustment value as the histogram correlation lowers.

In general, it is considered that the lower the degree of histogram correlation is, the smaller, more limited regions covered with the green fogs. Decreasing the weight of the color balance adjustment value can further weaken the green fog correction, thereby positively preventing magenta fogs that might otherwise occur in a wide range of the image.

(10) It is even preferable that the color balance adjusting section prepare predetermined, plural sets of data on correspondence between a color of a low-chroma region and a color balance adjustment value in accordance with kinds of color rendering performance of fluorescent lamps, calculate a color balance adjustment value by using a set of data for higher color rendering performance as the histogram correlation becomes lower, and adjust a color balance of the main image in accordance with the calculated color balance adjustment value.

In general, fluorescent lamps exhibiting high color rendering performance cause less green fogs. Therefore, the green fog correction is weakened by using a set of correspondence data for a fluorescent lamp exhibiting high color rendering performance. In other words, the lower the histogram correlation, i.e., the smaller the region with a green fog, the more weakened the green fog correction will be. This makes it possible to positively prevent magenta fogs that might otherwise occur in a wide range of the image.

(11) An electronic camera according to still another aspect of the invention includes an imaging section, a special light source determining section, an even illumination judging section, and a color balance adjusting section.

The imaging section generates an image by shooting an object. The special light source determining section detects a color fog caused by a special light source upon determining that chromaticity of a low-chroma region in the image is separated from the black body locus. The even illumination judging section judges evenness of illumination to the image.

The color balance adjusting section corrects a color fog in such a manner as to reduce the separation of the chromaticity of the shot image from the black body locus if the illumination to the image is judged even and the color fog is detected in the low-chroma region. The color balance adjusting section weakens the color fog correction if the illumination to the image is judged uneven and the color fog is detected in the low-chroma region.

In the above operation, first, a low-chroma region is extracted from a shot image, and a color fog caused by a special light source is detected by judging a separation of chromaticity of the low-chroma region from the black body locus. Then, the evenness of the illumination to the shot image is judged. This judgment is preferably made by performing such processing as the above-described histogram comparison, determination of a luminance distribution by multi-pattern photometry, or comparison of average luminances of a plurality of locations of the shot image.

Here, it is able to know occurrence of a color fog caused by the special light source in a wide range of the shot image in a case where a color fog is detected in a part (i.e., a low-chroma region) of the shot image in which the illumination is judged even. In this case, the electronic camera corrects the color fog by adjusting the color balance to reduce the separation of the chromaticity of the shot image from the black body locus. As a result, the degrees of the color fogs occurring in the wide range of the image can be lowered reliably.

On the other hand, if a color fog is detected in a part (i.e., a low-chroma region) of the shot image in which the illumination is judged uneven, it is able to know that color fogs caused by the special light source have occurred in only a part of the shot image. In this case, the electronic camera performs a weak color fog correction. This prevents occurrence of a problem that new color fogs might otherwise occur by the color fog correction.

(12) An electronic camera according to a further aspect of the invention includes an image acquiring section, a luminance ratio detecting section, and a color balance adjusting section.

The image acquiring section acquires a non-flash image and a flash image by controlling a flash device, the non-flash image being captured without a flash, the flash image being captured with a flash.

The luminance ratio detecting section determines a ratio of luminance Rnf of different regions A and B of a frame of the non-flash image, determines a ratio of luminance Rf of the different regions A and B of a frame of the flash image, to calculate a flash-induced variation C between the luminance ratios Rnf and Rf.

The color balance adjusting section sets a color balance adjustment in such a manner that the larger the variation C is, the greater importance placed on a color temperature of the flash is, and performs the set color balance adjustment on a main image that is captured with a flash.

The electronic camera having the above configuration calculates a luminance ratio of two different regions A and B of a frame of an image. If the luminance ratio is changed greatly by flash illumination, it can be judged that the flash has reached the regions A and B unevenly or the reflectance distribution in the field is not even. Where the illumination is thus not uniform, it is difficult to perform proper white balance adjustments on the basis of a color temperature that is estimated from the flash image itself. If white balance adjustments are made in this state, the colors of portions having different color temperatures from the estimated one will be adjusted into unnatural colors.

In view of the above, with a large variation C between the luminance ratios of the flash image and the non-flash image, color balance adjustments are performed with greater importance placed on the flash color temperature. In general, a portion that is illuminated brightly with a flash is positioned near the camera or in front of the camera, and hence the portion is very likely to be a major object. Therefore, it is possible to adjust the color balance of the major object satisfactorily at a high rate by performing color balance adjustments in such a manner that the larger the variation C is, the greater importance placed the flash color temperature.

Note that the above-mentioned luminance ratio is the ratio between luminance values of the regions A and B and hence is a relative value. Therefore, the luminance ratio is less prone to reflect differences in the exposure conditions (image sensor, aperture number, imaging sensitivity, and charge storage time). This allows the exposure conditions for capturing a flash image and a non-flash image not to be the same completely: changing the exposure conditions as desired is allowable. In slow synchronous shooting, for example, the charge storage time of a non-flash image can be shortened as desired. In this example, main flash shooting does not delay much, reducing the possibility of missing a good shooting opportunity.

In addition, the above configuration also enables high-level exposure controls such as changing the exposure conditions for flash shooting according to circumstances by analyzing a non-flash image.

(13) It is preferable that the luminance ratio detecting section determine a ratio of luminance Rnf between a center region of a frame of the non-flash image and a whole frame or a peripheral region of the frame thereof, and determines a ratio of luminance Rf between a center region of a frame of the flash image and a whole frame or a peripheral region of the frame thereof.

In many cases, a part of a major object is included in a center region of a frame. Therefore, determining a luminance ratio in the above manner makes it possible to detect unevenness in flash illumination between a major object and other portions without fail, which in turn heightens the possibility to adjust the color balance of the main object satisfactorily.

(14) It is preferable that the color balance adjusting section set a color balance adjustment in such a manner that the smaller the variation C is, the greater the importance placed on a color temperature of the main image or the flash image, and perform the set color balance adjustment on the main image.

Where the luminance ratio is not varied much by flash illumination, it can be judged that the regions A and B are illuminated with the flash almost evenly, even though ordinary flash illumination sources are similar to a point light source and hence tend to cause unevenness in the illumination. Almost even illumination with the flash may indicate one of the following situations, for example:

Situation 1: The field is like a flat plate and is illuminated with the flash uniformly.

Situation 2: The field is illuminated with external light more than the flash and hence the flash does not affect the state of the illumination much.

Situation 3: The flash illumination does not reach the objects sufficiently because the objects on the whole are distant from the camera, for example.

If color balance adjustments are performed with importance placed on the flash color temperature in these cases, the color balance will be adjusted unnaturally in Situation 2 and 3.

In view of this, according to item (14), color adjustments are set in such a manner that the smaller the flash-induced variation of the luminance ratio is, the greater the importance placed on the color temperature of the main image or the flash image is. With approximate uniform illumination, the color temperature can be estimated relatively accurately from the flash-shot main image (or the flash image). As a result, the color balance of the main image can be adjusted satisfactorily at a high rate in each of Situations 1 to 3.

(15) It is preferable that the color balance adjusting section decrease green fog correction amounts in the color balance adjustment as the variation C increases, the green fog correction amounts being for increasing red and blue components relatively to a green component.

In general, where the luminance ratio is varied greatly due to emission/no emission of flash, one of the regions A and B corresponds to a portion that was illuminated brightly with the flash. This portion was illuminated mostly with the flash illumination and hence the degree of green fogs due to fluorescent lamps is low therein.

In view of this, according to the setting in item (15), the larger the variation C is, the smaller the green fog correction amounts in the color balance adjustment. With this operation, it is possible to surely prevent occurrence of magenta fogs due to excessive green fog correction in a portion that was illuminated brightly with a flash (the portion is likely to be a major object).

(16) It is preferable that the image acquiring section include an auxiliary image sensor and a main image sensor. The auxiliary image sensor captures the non-flash image in a state that the flash device is not flashing. The main image sensor captures the flash image (also serves as the main image) in a state that the flash device is flashing.

The auxiliary image sensor for a non-flash image and the main image sensor for a flash image can be provided separately because the above-mentioned luminance ratio is a relative value and hence the differences in the image sensors are less prone to cause a difference in the luminance ratio.

Even with an increase in the number of pixels of the electronic camera (main image sensor), it is possible to maintain a short image read time of a non-flash image by keeping small the number of pixels of the auxiliary image sensor. This makes it possible to further shorten the processing time for an image-capturing sequence.

(17) It is preferable that the image acquiring section include an auxiliary image sensor and a main image sensor. The auxiliary image sensor captures the non-flash image before or after the flash device emits a preliminary flash and captures the flash image while the flash device is emitting a preliminary flash. The main image sensor captures the main image in a state that the flash device is emitting a main flash.

In this configuration, the main image sensor is used for capturing a main image. Therefore, even with an increase in the number of pixels of the electronic camera (main image sensor), it is possible to maintain a short image read time for a non-flash image and a flash image by keeping small the number of pixels of the auxiliary image sensor. This makes it possible to further shorten the processing time for an image-capturing sequence.

(18) The invention provides a program for causing a computer to function as the histogram calculating section, the histogram correlation judging section, the white balance calculating section, and the white balance adjusting section that are recited in the above item (1).

(19) The invention provides another program for causing a computer to function as the histogram calculating section, the histogram correlation judging section, the special light source determining section, and the color balance adjusting section that are recited in the above item (7).

(20) The invention provides still another program for causing a computer to function as the special light source determining section, the even illumination judging section, and the color balance adjusting section that are recited in the above item (11).

(21) The invention provides a further program for causing a computer to function as the luminance ratio detecting section and the color balance adjusting section that are recited in the above item (12).

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 4 shows two exemplary histogram distributions A and B;

FIG. 5 shows an exemplary relationship between the correlation between histogram distributions A and B and the weights of white balance adjustment values and the Euclid distance D;

DESCRIPTION OF THE PREFERRED EMBODIMENTS

Embodiments of the present invention will be hereinafter described in detail with reference to the drawings.

[1] First Embodiment

Configuration of First Embodiment

Figure 1:
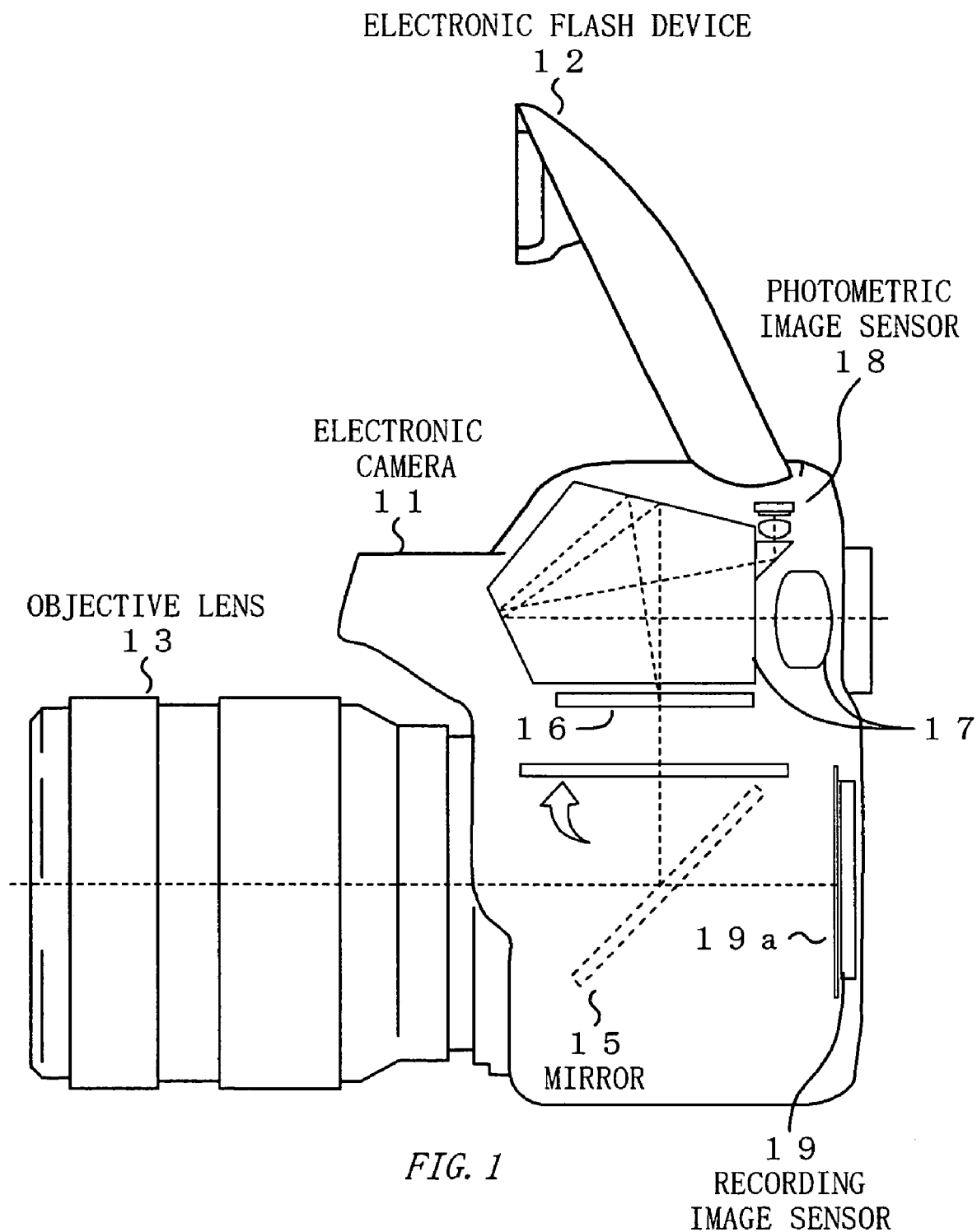
FIG. 1 shows an arrangement of components of an electronic camera 11.

FIG. 1 shows an arrangement of components of an electronic camera 11. As shown in FIG. 1, the electronic camera 11 is equipped with an electronic flash device 12 and an objective lens 13. A quick return mirror 15 is provided in the image space of the objective lens 13. A diffuser 16 is disposed at the image forming position of light that originates from an object and is reflected by the mirror 15. The user observes an object image formed on the diffuser 16 via a finder optical system 17. Light originating from the diffuser 16 is introduced to the imaging surface of a photometric image sensor 18 that is disposed in a corner of the space where the finder optical system 17 is provided, and an object image is formed again on the imaging surface. A shutter 19a, a recording image sensor 19, etc. are disposed behind the mirror 15.

Figure 2:
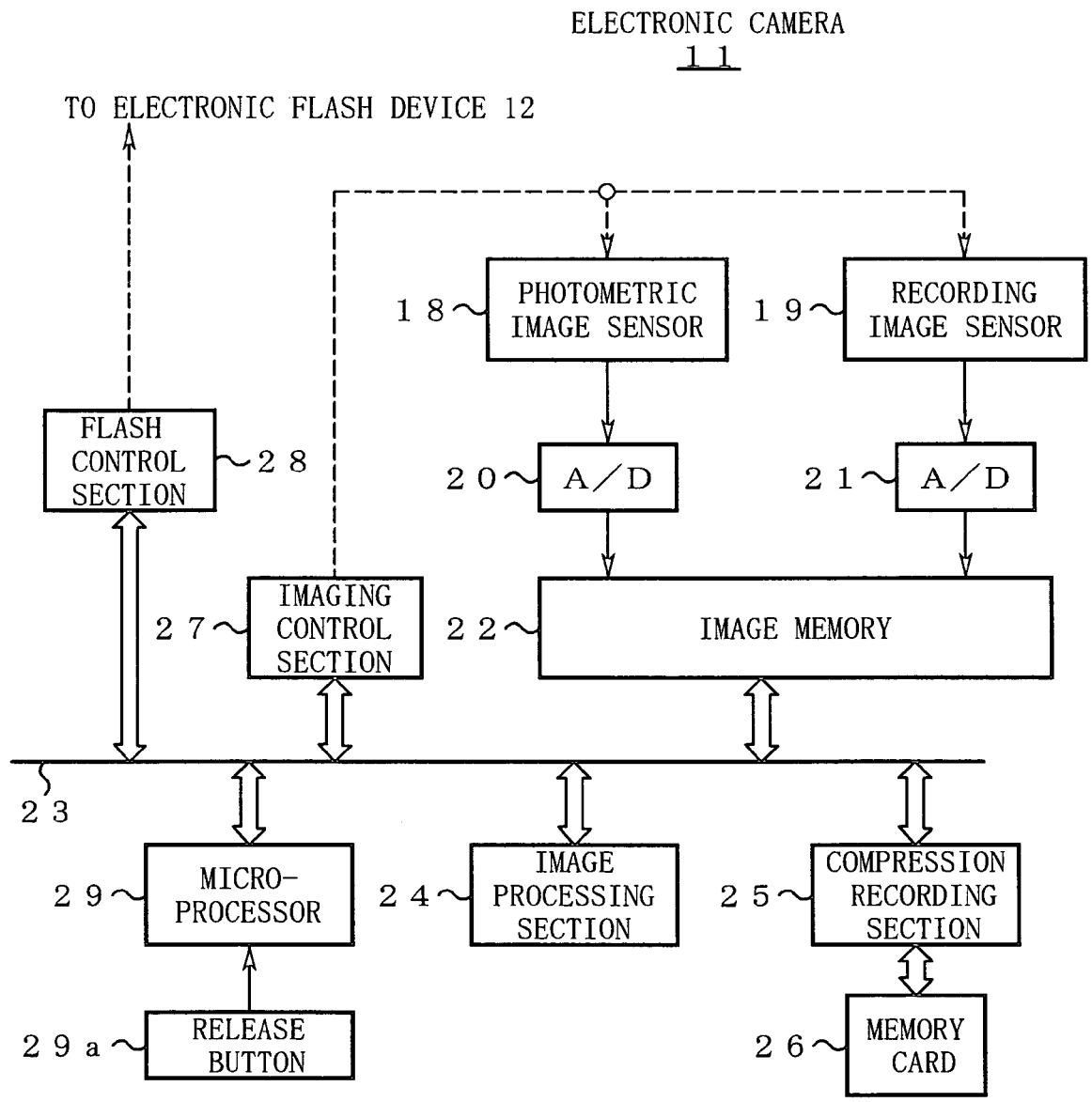
FIG. 2 is a block diagram showing image processing that is performed by the electronic camera 11.

FIG. 2 is a block diagram showing image processing that is performed by the electronic camera 11. As shown in FIG. 2, an output of the photometric image sensor 18 is supplied to an image memory 22 via an A/D conversion section 20. An output of the recording image sensor 19 is supplied to the image memory 22 via an A/D conversion section 21. The image memory 22 is connected to a bus 23. An image processing section 24, a compression recording section 25, an imaging control section 27, a flash control section 28, a microprocessor 29, etc. are connected to the bus 23.

Among the above components and sections, the compression recording section 25 compression-records image data in a detachable memory card 26. The microprocessor 29 is given a manipulation input from a release button 29a or the like.

Relationship with Claims

A relationship between the claims and the first embodiment will be described below. This relationship is just one interpretation for reference and should not be used for restricting the invention unduly.

The imaging section in the claims corresponds to the photometric image sensor and the recording image sensor 19.

The imaging control section in the claims corresponds to the imaging control section 27.

The histogram calculating section in the claims corresponds to a function, of the microprocessor 29, of histogram-analyzing image data and thereby generating a histogram distribution.

The histogram correlation calculating section in the claims corresponds to a function, of the microprocessor 29, of comparing two histogram distributions and thereby detecting their correlation. The white balance calculating section in the claims corresponds to a function, of the microprocessor 29, of determining a white balance adjustment value in accordance with correlation between histogram distributions.

The white balance adjusting section in the claims corresponds to a function, of the image processing section 24, of adjusting the white balance of a main image.

Operation of First Embodiment

Figure 3:
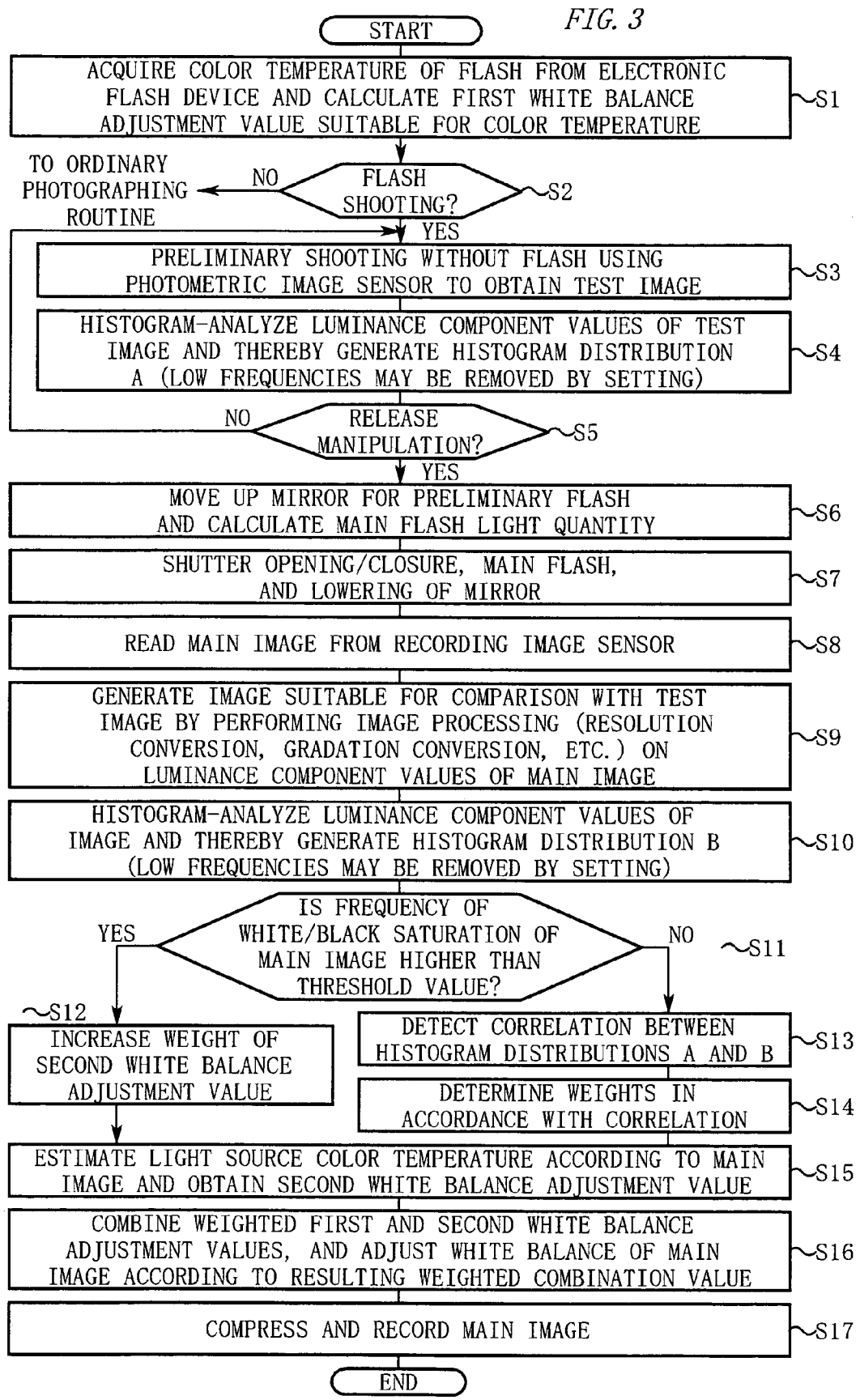
FIG. 3 is a flowchart showing the operation of a first embodiment.

FIG. 3 is a flowchart showing the operation of the first embodiment. The operation of the electronic camera 11 will be described below in order of step numbers shown in FIG. 3.

[Step S1] When the main power of the electronic camera 11 is turned on, the microprocessor 29 starts initialization processing to be performed at the time of power application. In the initialization processing, the microprocessor 29 acquires information relating to a color temperature of a flash from the electronic flash device 12 and calculates a first white balance adjustment value suitable for the color temperature.

[Step S2] The microprocessor 29 judges whether the electronic camera 11 is in a flash-shooting mode.

If the flash-shooting mode is not set, the microprocessor 29 makes a transition to an ordinary photographing routine (not shown) to perform known ordinary photographing. In the ordinary photographing routine, an image shot with the photometric image sensor 18 is used for divisional photometry, for example.

On the other hand, if the flash shooting mode is set, the microprocessor 29 moves to step S3.

[Step S3] At this point of time, the mirror 15 is at the low position. Therefore, after passing through the objective lens 13, object light goes through the diffuser 16 and the finder optical system 17 and forms an object image on the imaging surface of the photometric image sensor 18.

In this state, the microprocessor 29 gives a drive signal to the photometric image sensor 18 using the imaging control section 27. The photometric image sensor 18 outputs a test image that has been picked up without flash. The test image is digitized on a pixel-by-pixel basis by the A/D conversion section 20 and then stored in the image memory 22 (temporary storage).

[Step S4] The microprocessor 29 accesses the image memory 22 and calculates a luminance component of each small region (e.g., each pixel) of the test image.

It is preferable to generate a luminance component by subjecting color components of the test image to weighted addition according to their proportions in constituting a luminance component (e.g., R:G:B=0.29:0.587:0.114). Alternatively, a color component (e.g., green component) that greatly contributes to a luminance component of the test image may be regarded as a luminance component as it is.

The microprocessor 29 roughly divides the thus-calculated luminance component values of the test image into luminance ranges and determines a frequency for each of the luminance ranges. A histogram distribution A of the test image is thus obtained as shown in FIG. 4.

Data modification such as noise elimination or extraction of a large-area region may be performed by removing frequencies that are lower than a predetermined value from the histogram distribution A.

[Step S5] The microprocessor 29 judges whether the release button 29*a* has been pressed fully.

If the release button 29*a* has been pressed fully, the microprocessor 29 moves to step S6.

On the other hand, if the release button 29*a* has not been pressed fully (i.e., has been half pressed or has not been pressed at all), the microprocessor 29 returns to step S3.

[Step S6] The microprocessor 29 performs known preliminary flashing in the following manner. First, the microprocessor 29 causes the mirror 15 to jump up so that an object image is projected onto the shutter blades of the shutter 19*a*. In this state, using the flash control section 28 the microprocessor 29 causes the electronic flash device 12 to emit a weak preliminary flash. The microprocessor 29 measures brightness of the shutter blades at the time of the preliminary flashing using a photometric element (not shown) that is disposed at such a position as to fully cover the shutter 19*a*. The microprocessor 29 determines a target light quantity of a main flash in accordance with the brightness of the shutter blades at the time of the preliminary flashing. The determined target light quantity of a main flash is transmitted to the electronic flash device 12.

[Step S7] The microprocessor 29 opens the leading blade of the shutter 19*a* and thereby starts to project an object image onto the imaging surface of the recording image sensor 19.

In the case of single-shot main flashing, the microprocessor 29 causes the electronic flash device 12 to start a main flash when the shutter 19*a* has been fully opened. Monitoring the light quantity of the main flash, the electronic flash device 12 stops the main flash at a point of time when the light quantity has reached the pre-informed target value.

When a preset shutter time has elapsed, the microprocessor 29 closes the trailing blade of the shutter 19*a*. After the shutter 19*a* is fully closed in this manner, the microprocessor 29 lowers the mirror 15.

[Step S8] The microprocessor 29 gives a drive signal to the recording image sensor 19 using the imaging control section 27. The recording image sensor 19 outputs a main image that has been picked up with flash. The main image is digitized on a pixel-by-pixel basis by the A/D conversion section 21 and then stored in the image memory 22 (temporary storage).

[Step S9] The microprocessor 29 accesses the image memory 22, reads out the main image, and generates an image for processing that is suitable for comparison with the test image.

For generation of the image for processing, it is preferable to perform the following processing for decreasing differences between devices:

(1) Processing of cutting out an image for processing from the main image in accordance with an angle of view of imaging of the test image.

(2) Processing of dividing the main image into pixel blocks that correspond to the positions of the respective small regions (refer to step S4) of the photometric image sensor 18, and calculating luminance component values (including quasi-luminance component values such as green component values) for the respective pixel blocks.

(3) Processing of normalizing a maximum gradation value, an average gradation value, a highest frequency gradation value, a minimum gradation value, etc. of the main image so that they conform to those of the test image.

(4) Processing of converting the number of gradation steps and a gradation curve of the main image in accordance with a gradation characteristic of the test image.

[Step S10] The microprocessor 29 histogram-analyzes luminance component values of the image for processing generated from the main image in the same manner as the test image was done, and thereby generates a histogram distribution B as shown in FIG. 4.

Data modification such as noise elimination or extraction of a large-area region may be performed by removing frequencies that are lower than a predetermined value from the histogram distribution B.

[Step S11] The microprocessor 29 determines a frequency of white saturation and black saturation from the histogram distribution B.

If this frequency is higher than a predetermined threshold value, it means that the signal levels of the main image vary nonlinearly (e.g., they are saturated). Therefore, it can be judged that the main image and the test image are not suitable for comparison objects. In this case, the microprocessor 29 moves to step S12.

On the other hand, if this frequency is lower than the prescribed threshold value, the microprocessor 29 moves to step S13.

[Step S12] The microprocessor 29 does not perform histogram comparison between the main image and the test image and increases the weight of a second white balance adjustment value. Then, the microprocessor 29 moves to step S15.

[Step S13] The microprocessor 29 compares the shapes of the two histogram distributions A and B and thereby calculates correlation between them.

For example, correlation between the histogram distributions A and B may be obtained by calculating a Euclid distance D according to the following equation. In this case, it can be judged that the shorter the Euclid distance D is, the higher the degree of correlation.

$$D = \sqrt{\sum_i (Ni - Mi)^2} \qquad (1)$$

where Ni and Mi are frequencies of the histogram distributions A and B for the same luminance range i.

Alternatively, correlation between the histogram distributions A and B may be detected from their similarity by performing pattern matching on their shapes.

As a further alternative, correlation may be obtained by judging the degree of coincidence of the histogram distributions A and B in the number of peaks, peak intervals, magnitude relationships between a plurality of peaks, peak shapes, or the like.

[Step S14] The microprocessor 29 gives a heavier weight to a second white balance adjustment value to be calculated at step S14 as the obtained degree of correlation is higher. In other words, the microprocessor 29 gives a heavier weight to the first white balance adjustment value as the obtained degree of correlation is lower.

FIG. 5 shows an exemplary relationship between the weights and the Euclid distance D that is calculated according to Equation (1).

[Step S15] The microprocessor 29 estimates a light source color temperature on the basis of the main image that is stored in the image memory 22 and calculates a second white balance adjustment value suitable for the estimated light source color temperature.

For example, a light source color temperature may be estimated by calculating average values of the respective color components in the entire main image or a certain region of it. In this case, it is appropriate to determine a second white balance adjustment value so that an average color thus determined becomes an achromatic color.

Alternatively, a light source color temperature may be estimated by extracting pixels that are close to achromatic colors and calculating an average color of the extracted pixels. In this case, it is appropriate to determine a second white balance adjustment value so that the average color of the extracted pixels becomes an achromatic color.

If the weight of a second white balance adjustment value is zero at step S14, it is preferable to omit execution of step S15.

[Step S16] The microprocessor 29 combines the first and second white balance adjustment values while applying the calculated weights to them. The microprocessor 29 communicates a resulting combination value to the image processing section 24 as a white balance adjustment value.

The image processing section 24 performs white balance adjustments on the main image in the image memory 22 according to the white balance adjustment value.

[Step S17] The main image that has been subjected to the white balance adjustments at step S16 is image-compressed and recorded on the memory card 26 by the compression recording section 25.

Advantages etc. of First Embodiment

In the first embodiment, with the above-described operation, histogram distributions of a test image produced without flash and a main image produced with flash are compared with each other. It can be judged that the more similar shapes the histogram distributions have, the higher the degree of evenness of the flash illumination is. Conversely, it can be judged that the less similar shapes the histogram distributions have, the lower the degree of evenness of the flash illumination is.

In the first embodiment, based on these judgments, the electronic camera switches a white balance adjustment to one with greater importance placed on an estimated color temperature of the main image if the degree of uniformity of the flash illumination is high. In this case, the estimated color temperature correctly reflects a color temperature of mixed light that is used at the time of flash shooting. Therefore, the white balance can be adjusted properly over the entire image by performing white balance adjustments, placing greater importance on the estimated color temperature of the main image.

In the first embodiment, white balance adjustment switching is made in order to place greater importance on a color temperature of a flash when the degree of uniformity of the flash illumination is low. In this case, an image region that is illuminated brightly with the flash, that is, a region that corresponds to, at a high probability, the white balance of a major object that is close to the camera, can be adjusted properly.

In particular, the above comparison between histogram distributions makes it possible to disregard subtle pattern differences between a test image and a main image. Therefore, unlike in the conventional apparatus disclosed in Reference 1, proper white balance adjustments can be performed receiving almost no influences of an object movement, a camera shake, or the like.

Incidentally, there may occur a phenomenon that the signal levels of a main image vary nonlinearly because of too bright flash illumination. In this case, the main image cannot be compared with a test image correctly and hence the degree of uniformity of the flash illumination cannot be judged correctly. In view of this, in the first embodiment, if there are many regions with white saturation and black saturation in a main image, the degree of uniformity of the flash illumination is not judged and white balance adjustment switching is made to place greater importance on the color temperature of the main image. In this case, although the main image contains regions with white and black saturation, they are not likely to cause errors in estimating a light source color temperature on the basis of the main image because those nonlinear regions are low in chroma. Therefore, even if white balance adjustments are performed with reference to the main image containing regions with white/black saturation, a new main image can be produced with relatively high reproduction performance.

In the first embodiment, a test image is picked up with the photometric image sensor 18 for divisional photometry. Since the photometric image sensor 18 is smaller than the recording image sensor 19 in the number of pixels, it is possible to save the time necessary for the image pickup and image processing (histogram generation etc.) on a test image. As a result, the increase in the processing load is small even if the operation of determining a white balance adjustment value (described above) is taken into account, and hence the shooting operation of the electronic camera 11 can be kept nimble.

At step S9 of the first embodiment, the main image is processed and made suitable for comparison with the test image. As a result, the main image and the test image can be compared with each other properly though the different image sensors are used, which makes it possible to judge the degree of uniformity of flash illumination more accurately.

Further, in the first embodiment, two histogram distributions A and B are compared with each other after frequencies lower than the predetermined value are removed from the histogram distributions A and B. This removal processing makes it possible to lower noise influences and to thereby judge the degree of uniformity of flash illumination more accurately. It is also possible to remove low frequencies from histogram distributions so as to leave only particularly high frequencies in images. In this case, the degree of uniformity of flash illumination can be judged by using only high-frequency regions that are conspicuous in images. As a result, white balance adjustments can be realized that are targeted on visually conspicuous high-frequency regions.

Next, another embodiment will be described.

[2] Second Embodiment

Configuration of Second Embodiment

The configuration of a second embodiment is the same as that of the first embodiment (see FIGS. 1 and 2) and hence will not be described to avoid redundancy.

Relationship with Claims

A relationship between the claims and the second embodiment will be described below. This relationship is just one interpretation for reference and should not be used for restricting the invention unduly.

The imaging section in the claims corresponds to the photometric image sensor 18 and the recording image sensor 19.

The imaging control section in the claims corresponds to the imaging control section 27.

The histogram calculating section in the claims corresponds to a function, of the microprocessor 29, of histogram-analyzing image data and thereby generating a histogram distribution.

The histogram correlation calculating section in the claims corresponds to a function, of the microprocessor 29, of comparing two histogram distributions and thereby detecting their correlation.

The special light source determining section in the claims corresponds to a function, of the microprocessor 29, of detecting color fogs of a special light source (e.g., green fogs due to fluorescent lamps) by extracting low-chroma regions from a main image produced by the recording image sensor 19 and judging a separation of the center of chromaticity distribution of the low-chroma regions from the black body locus.

The color balance adjusting section in the claims corresponds to a function, of the image processing section 24, of adjusting the color balance of a main image in accordance with the degree of uniformity of an illumination state and a result of detection of color saturation in low-chroma regions.

The illumination uniformity judging section in the claims corresponds to a function, of the image processing section 24, of judging the degree of uniformity of illumination by generating histogram distributions on the basis of image data before and after flash and detecting correlation between the two histogram distributions.

Operation of Second Embodiment

Figure 6:
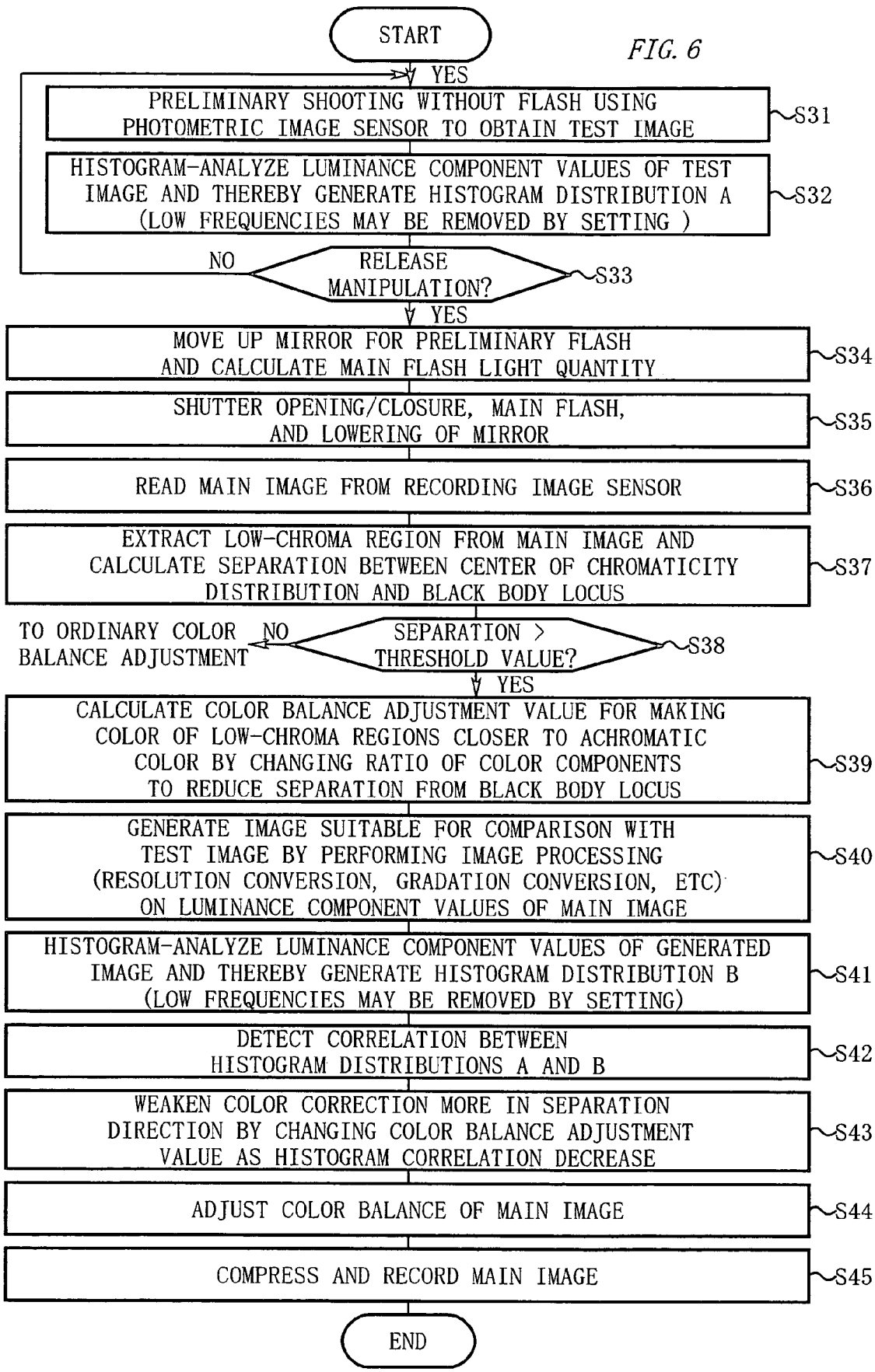
FIG. 6 is a flowchart showing the operation of a second embodiment.

FIG. 6 is a flowchart showing the operation of the second embodiment. The operation of the electronic camera 11 will be described below in order of step numbers shown in FIG. 6.

[Steps S31-S36] Steps S31-S36 are the same as steps S3-S8 of the first embodiment and hence will not be described to avoid redundancy.

[Step S37] The microprocessor 29 accesses the image memory 22 and reads low-chroma regions (i.e., regions where the chroma is lower than a prescribed value) from the main image. The microprocessor 29 determines chromaticity (R/G and B/G) of each small region (e.g., each pixel) using RGB components in the low-chroma regions, and determines the center of distribution of those sets of chromaticity values. Then, the microprocessor 29 calculates a separation between the distribution center and the black body locus on the chromaticity plane.

[Step S38] The microprocessor 29 judges whether the separation calculated at step S37 is greater than a threshold value. The threshold value, which is used for judging whether the separation is such as to be detected as color fogs, can be determined by, for example, conducting a subjective evaluation experiment on images.

If the separation is smaller than or equal to the threshold value, it can be judged that the separation is such as not to be detected as color fogs. In this case, the microprocessor 29 moves to ordinary color balance adjustments.

On the other hand, if the separation is greater than the threshold value, the microprocessor 29 judges that the light source is a special one (e.g., a fluorescent lamp or a sodium-vapor lamp) whose wavelength profile is much distant from the black body locus. In this case, the microprocessor 29 moves to color balance adjustments of step S39 and the following steps.

[Step S39] The microprocessor 29 calculates a temporary color balance adjustment value for making the color of the low-chroma regions closer to an achromatic color by setting the color component adjustment gains such that the separation from the black body locus is decreased.

For example, in the case of green fogs of fluorescent lamps, a color balance adjustment value is calculated by setting the adjustment gains so that the red and blue components are made relatively large to decrease a separation toward green from the black body locus.

[Steps S40 and S41] Steps S40 and S41 are the same as steps S9 and S10 of the first embodiment and hence will not be described to avoid redundancy.

[Step S42] The microprocessor 29 calculates correlation between the two histogram distributions A and B in the same manner as in step S13 of the first embodiment.

The following judgment can be made depending on the degree of correlation.

(Case of High Histogram Correlation)

First, if the histogram correlation is high, it means that the object arrangement is such that a flash reaches the objects uniformly or the objects are so distant uniformly as to be out of an effective range of a flash. With such an object arrangement, it can be judged that the unevenness of illumination light is low, that is, the degree of uniformity of the illumination is high.

On the other hand, color fogs have already been detected in low-chroma regions of the image at step S38. Based on these facts, it can be judged that the color fogs due to the special light source are also highly uniform and exist in a wide area of the image.

(Case of Low Histogram Correlation)

Conversely, if the histogram correlation is low, it can be judged that the object arrangement is such as to have unevenness in the way a flash reaches objects and the luminance distribution has been changed greatly by the flash. An example is such that nearby objects that are brightly illuminated with a flash and distant objects that are hard to illuminate effectively with the flash are mixed in the same frame. With such an object arrangement, particular illumination light (from the sun, streetlamps, the flash device, fluorescent lamps, or the like) does unevenly reach the objects and the degree of uniformity of the illumination can be judged low.

On the other hand, color fogs have already been detected in low-chroma regions of the image at step S38. Based on these facts, it can be judged that the color fogs due to the special light source are non-uniform and exist in only parts of the image.

[Step S43] The microprocessor 29 changes the color balance adjustment value such that the lower calculated histogram correlation is, more weakened color fog correction is. In the case of a green fog correction, for example, when the histogram correlation is low, the correction is weakened by somewhat decreasing the adjustment gains of the red and blue components.

Methods for weakening the color fog will be described below in detail.

(Color Fog Correction Adjusting Method-1)

The microprocessor 29 calculates a correlation color temperature by mapping the center of the chromaticity distribution of the low-chroma regions that was calculated at step S37 to the black body locus. This correlation color temperature is a color temperature on the black body locus in which green fogs in the separation direction are not taken into consideration. The microprocessor 29 calculates a white balance adjustment value for conversion of this correlation color temperature into a standard color temperature. The microprocessor 29 combines this white balance adjustment value and the previously calculated color balance adjustment value (step S39) while applying weights to them. This weighted combining can weaken the color fog correction on the color balance adjustment value, which in turn makes it possible to suppress occurrence of new color fogs (e.g., magenta fogs) that would otherwise be caused by the color fog correction. Further, since the value obtained by the weighted addition reflects the white balance adjustment value, the color temperature can be made closer to a standard color temperature in regions that are free of color fogs (e.g., an object in front of the camera that is illuminated with a flash) and the color reproduction performance of the main image can thereby be enhanced.

(Color Fog Correction Adjusting Method-2)

As in the case of the above-described adjusting method-1, the microprocessor 29 combines the white balance adjustment value that has been calculated on the basis of the correlation color temperature with the color balance adjustment value for the color fog correction while applying weights to them. The microprocessor 29 changes the ratio of the weighted combining in accordance with the histogram correlation that was calculated at step S42, that is, decreases the weight of the color balance adjustment value as the histogram correlation becomes lower. As a result, the color fog correction can be made weaker as the histogram correlation becomes lower and hence the uniformity of color fogs in the image becomes lower (i.e., color fogs are localized more), whereby occurrence of new color fogs can be suppressed strongly that would otherwise be caused by the color fog correction. Conversely, the microprocessor 29 increases the weight of the color balance adjustment value as the histogram correlation becomes higher. As a result, the color fog correction can be made stronger as the histogram correlation becomes higher and hence the uniformity of color fogs in the image becomes higher (i.e., the area of color fogs becomes wider), whereby color fogs in a wide area of the image can be eliminated properly.

(Color Fog Correction Adjusting Method-3)

For example, fluorescent lamps are classified into a plurality of groups that are different in color rendering performance.

The microprocessor 29 stores, for each color rendering performance group, correspondence data between color distribution centers (calculated at step S37) and color balance adjustment values for the green fog correction. For example, the correspondence data can be obtained by repeatedly conducting, for each color rendering performance group, subjective evaluation experiments for the color balance adjustment on a main image. In this case, green fogs are eliminated at a higher degree when the correspondence data of a group of lower color rendering performance are used. In other words, green fogs are eliminated at a lower degree when the correspondence data of a group of higher color rendering performance are used. Therefore, the microprocessor 29 determines a color balance adjustment value using the correspondence data of a group of higher color rendering performance as the histogram correlation becomes lower. As a result, the color fog correction can be weakened and occurrence of new color fogs that would otherwise be caused by the color fog correction can be suppressed more strongly as the histogram correlation becomes lower and the uniformity of color fogs in the image becomes lower (i.e., color fogs are localized more).

[Step S44] The microprocessor 29 performs color balance adjustments on the main image in accordance with the adjustment value that was changed at step S43 to adjust the strength of the color fog correction.

[Step S45] The main image on which the color balance adjustments were performed at step S44 is image-compressed by the compression recording section 25 and stored in the memory card 26.

Advantages etc. of Second Embodiment

As described above, in the second embodiment, the judgment of the uniformity of the illumination state and the detection of color fogs in low-chroma-regions are combined together. This makes it possible to judge whether color fogs exist in a wide area of an image or are restricted in a small area of the image.

In the second embodiment, the strength of the color fog correction is adjusted in accordance with the expanse of color fogs that is judged in the above manner. This makes it possible to properly prevent the undesired phenomenon that new color fogs appear after the correction.

In the second embodiment, histogram distributions of a test image produced without flash and a main image produced with flash are generated. Even if there occur some differences in patterns between the test image and the main image because of a time difference between them, the histogram distributions receive almost no influences from those differences and make it possible to judge the uniformity of the illumination state properly.

In the second embodiment, a test image is picked up with the photometric image sensor 18 for divisional photometry. Since the photometric image sensor 18 is smaller in the number of pixels than the recording image sensor 19, the use of the photometric image sensor 18 saves the time that is necessary for the pickup and image processing (histogram generation etc.) of a test image. As a result, the increase in the processing load is small even if the operation of determining a color balance adjustment value (described above) is taken into account, and hence the shooting operation of the electronic camera 11 can be kept nimble.

In particular, in the second embodiment, at step S40, the main image is processed and made suitable for comparison with the test image. As a result, the main image and the test image can be compared with each other properly though the different image sensors 18 and 19 are used, which makes it possible to judge the degree of uniformity of illumination state more accurately.

Further, in the second embodiment, two histogram distributions A and B are compared with each other after frequencies lower than the predetermined value are removed from the histogram distributions A and B. This removal processing makes it possible to lower noise influences and to thereby judge the degree of uniformity of the illumination state more accurately. It is also possible to remove low frequencies from histogram distributions so as to leave only particularly high frequencies in images. In this case, the degree of uniformity of the illumination state can be judged by using only high-frequency regions that are conspicuous in images. As a result, color balance adjustments can be realized that are targeted on visually conspicuous high-frequency regions.

[3] Third Embodiment

Configuration of Third Embodiment

The configuration of a third embodiment is the same as that of the first embodiment (see FIGS. 1 and 2) and hence will not be described to avoid redundancy.

Relationship with Claims

A relationship between the claims and the third embodiment will be described below. This relationship is just one interpretation for reference and should not be used for restricting the invention unduly.

The image acquiring section in the claims corresponds to the imaging control section 27, the flash control section 28, the photometric image sensor 18, and the recording image sensor 19.

The luminance ratio detecting section in the claims corresponds to a function, of the microprocessor 29, of calculating a variation C between luminance ratios Rf and Rnf.

The color balance adjusting section in the claims corresponds to a function, of the microprocessor 29 and the image processing section 24, of making necessary settings for color balance adjustments using the variation C as a measure and performing the color balance adjustments on the main image.

The auxiliary image sensor in the claims corresponds to the photometric image sensor 18.

The main image sensor in the claims corresponds to the recording image sensor 19.

Operation of Third Embodiment

Figure 7:
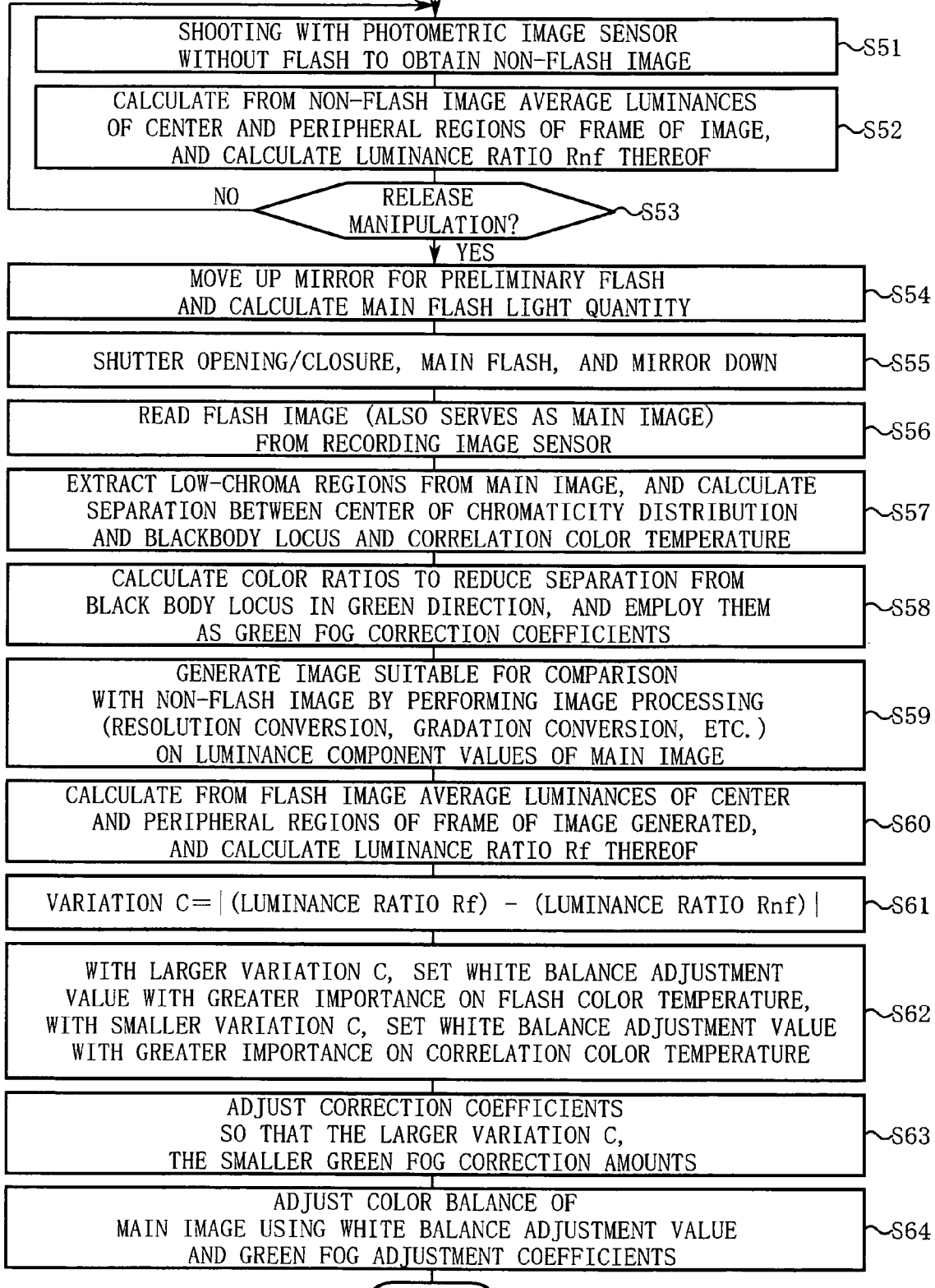
FIG. 7 is a flowchart showing the operation of a third embodiment.

FIG. 7 is a flowchart showing the operation of the third embodiment. The operation of the electronic camera 11 will be described below in order of step numbers shown in FIG. 7.

[Steps S51] Before a release manipulation, an object image is formed on the imaging surface of the photometric image sensor 18. In this state, the microprocessor 29 gives a drive signal to the photometric image sensor 18 using the imaging control section 27. The photometric image sensor 18 outputs a non-flash image that has been picked up without flash. The non-flash image is digitized on a pixel-by-pixel basis by the A/D conversion section 20 and then stored in the image memory 22 (temporary storage).

[Step S52] The microprocessor 29 accesses the image memory 22 and calculates a luminance component of each small region (e.g., each pixel) of the non-flash image.

It is preferable to generate a luminance component by subjecting color components of the non-flash image to weighted addition according to their proportions in constituting a luminance component (e.g., R:G:B=0.29:0.587:0.114). Alternatively, a color component (e.g., green component) that greatly contributes to a luminance component of the non-flash image may be regarded as a luminance component as it is.

The microprocessor 29 divides the thus-calculated luminance component values of the non-flash image into ones in a center region of the frame and ones in a peripheral region thereof, and calculates average luminance values for the respective regions. And the microprocessor 29 calculates a luminance ratio Rnf by substituting the average luminance values into the following equation:

(luminance ratio Rnf)=(average luminance of center region)/(average luminance of peripheral region).

To prevent the luminance ratio Rnf from overflowing even if the average luminance of the peripheral region is equal to zero, it is preferable to add a very small value to the denominator of the above equation.

[Step S53] The microprocessor 29 judges whether the release button 29a has been pressed fully.

If the release button 29a has been pressed fully, the microprocessor 29 moves to step S54.

On the other hand, if the release button 29a has not been pressed fully (i.e., has been half pressed or has not been pressed at all), the microprocessor 29 returns to step S51.

[Step S54] Step S54 is the same as step S6 of the first embodiment.

[Step S55] Step S55 is the same as step S7 of the first embodiment. In this step, it is preferable to flexibly change the charge storage time in accordance with the luminance distribution (histogram) or the like of the non-flash image.

[Step S56] The same processing as performed at step S8 of the first embodiment is performed, whereby a flash image (also serves as a main image) is obtained that has been picked up by flash shooting. The flash image is digitized on a pixel-by-pixel basis by the A/D conversion section 21 and then stored in the image memory 22 (temporary storage).

[Step S57] The microprocessor 29 accesses the image memory 22 and reads low-chroma regions (i.e., regions where the chroma is lower than a prescribed value) from the flash image. The microprocessor 29 determines chromaticity (R/G and B/G) of each small region (e.g., each pixel) using RGB components in the low-chroma regions, and determines the center of distribution of those sets of chromaticity values. Then, the microprocessor 29 calculates a separation between the distribution center and the black body locus on the chromaticity plane.

Further, the microprocessor 29 detects a correlation color temperature on the black body locus by mapping the distribution center to the black body locus.

[Step S58] The microprocessor 29 calculates color ratios (R gain and B gain) to be used for reducing the separation in the green direction and employs those as green fog correction coefficients.

[Step S59] The same processing as performed at step S9 of the first embodiment is performed, whereby the flash image in the image memory 22 is processed to generate an image that is suitable for comparison with the non-flash image.

[Step S60] The microprocessor 29 divides the image generated from the flash image into two, one in a center region of a frame and one in a peripheral region thereof, and calculates average luminance values for the respective regions. And the microprocessor 29 calculates a luminance ratio Rf by substituting the average luminance values into the following equation:

(luminance ratio Rf)=(average luminance of center region)/(average luminance of peripheral region).

To prevent the luminance ratio Rf from overflowing even if the average luminance of the peripheral image region is equal to zero, it is preferable to add a very small value to the denominator of the above equation.

[Step S61] The microprocessor 29 calculates a flash-induced variation C between the luminance ratios Rnf and Rf:

variation $C=|(\text{luminance ratio } Rf)-(\text{luminance ratio } Rnf)|$.

[Step S62] The following judgment and measures can be made or taken depending on the variation C.

(Case of Large Variation C)

If the variation C is large, it can be judged that the flash has reached central objects and peripheral objects in the frame unevenly. One example is that nearby objects brightly illuminated with a flash and distant objects not sufficiently illuminated with the flash are present in the same frame.

Figure 8:
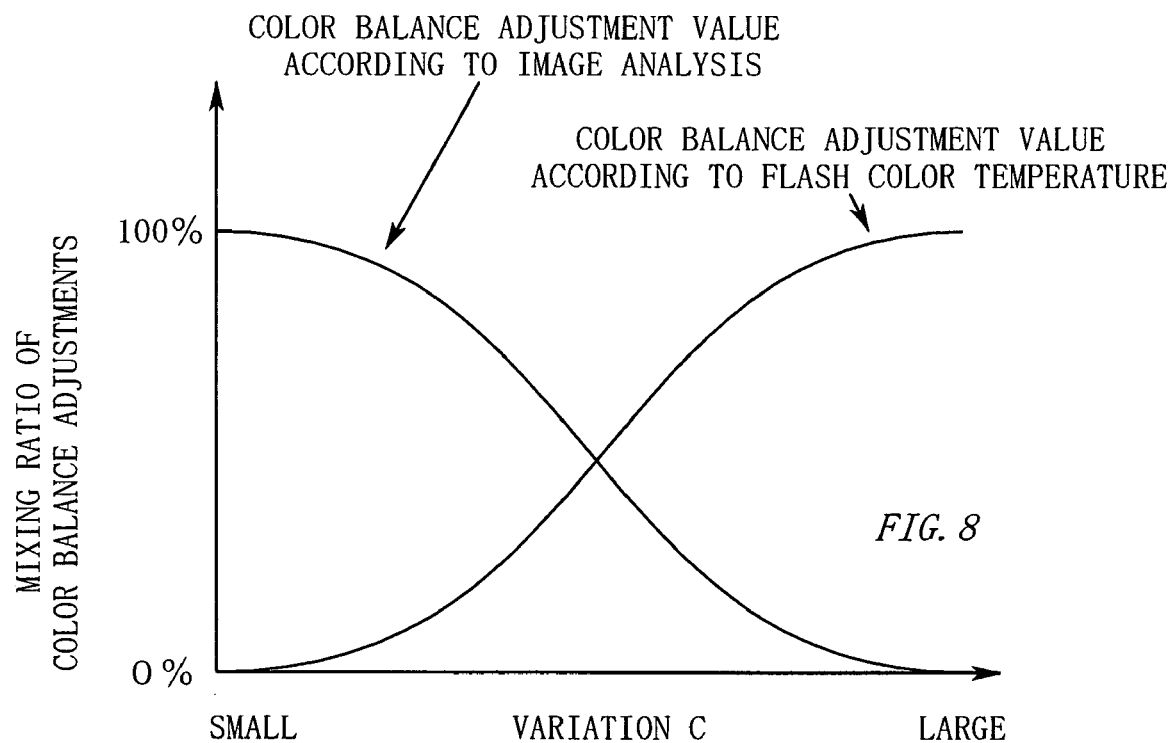
FIG. 8 is a graph showing a relationship between the variation C and the color balance adjustment value.

In view of the above, the microprocessor 29 sets a white balance adjustment value obtained by strengthening the correction for a color deviation relating to the flash color temperature more as the variation C increases (see FIG. 8).

This setting makes it possible to enhance the color reproducibility of the nearby objects (it is highly probable that they are major objects) that can be illuminated effectively with a flash.

(Case of Small Variation C)

On the other hand, if the variation C is small, it can be judged that the flash illumination has been uniform (i.e., the flash equally illuminated nearby objects and peripheral objects in the frame) or illuminated none of the objects sufficiently. In either object arrangement, it can be judged that the unevenness of illumination light is low, that is, the uniformity of illumination is high.

The microprocessor 29 sets a white balance adjustment value obtained by strengthening the correction for a color deviation relating to the correlation color temperature more as the variation C decreases (see FIG. 8).

This setting makes it possible to set a white balance adjustment value that is suitable for the uniform illumination in the frame and to thereby enhance the color reproducibility of all the objects in the frame.

[Step S63] As described above, if the variation C is large, it can be judged that the nearby objects were illuminated effectively with the flash. For those nearby objects, the proportion of the flash in the entire illumination light is large and almost no green fogs due to fluorescent lamps or the like occur.

Figure 9:
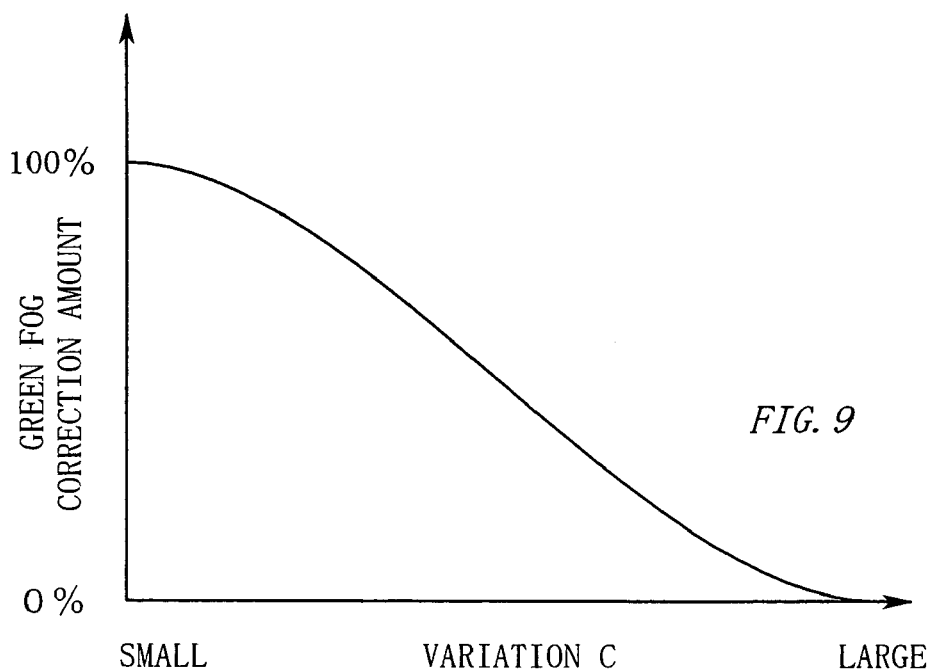
FIG. 9 is a graph showing a relationship between the variation C and the green fog correction amount.

Therefore, the microprocessor 29 adjusts the green fog correction coefficients so that the green fog correction amounts are decreased as the variation C increases (see FIG. 9).

This setting makes it possible to prevent a problem that opposite-direction magenta fogs occur in the nearby objects (it is highly probable that they are major objects) that can be illuminated effectively with a flash.

[Step S64] The microprocessor 29 reads out the white balance adjustment value that was set at step S62 and the green fog correction coefficients that were set at step S63. The microprocessor 29 adjusts the color component gains of the main image that was picked up at step S56 in accordance with the read-out values, and thereby generates a color-balance-adjusted main image.

Advantages etc. of Third Embodiment

As described above, in the third embodiment, calculated is a variation C between a luminance ratio Rnf of a non-flash image and a luminance ratio Rf of a flash image. If the variation C is large, it can be judged that nearby objects that were illuminated brightly with the flash existed in the frame. Therefore, in the third embodiment, a white balance adjustment value with a larger contribution of the flash color temperature is used as the variation C between the luminance ratios increases. This makes it possible to enhance the color reproducibility of the nearby objects (it is highly probable that they are major objects) that were illuminated brightly with the flash.

Since the above luminance ratios are a ratio (i.e., a relative value) between values of different regions in an image, they are less prone to be influenced by differences in the exposure conditions between the two images (non-flash image and flash image). Therefore, the variation C can be calculated correctly even if deviations occur in average luminance values because of differences in the exposure conditions between the two images. This makes it possible to properly shorten the charge storage time of a non-flash image and to thereby shorten the above-described imaging sequence.

Further, in the third embodiment, the green fog correction amounts are decreased as the variation C increases. This makes it possible to prevent an excessive green fog correction on regions in an image corresponding to objects that were illuminated brightly with a flash, and to properly prevent magenta fogs that would otherwise be caused by the excessive correction.

Next, a further embodiment will be described.

[4] Fourth Embodiment

The configuration of an electronic camera in a fourth embodiment is the same as that of the first embodiment (see FIGS. 1 and 2) and hence will not be described.

Figure 10:
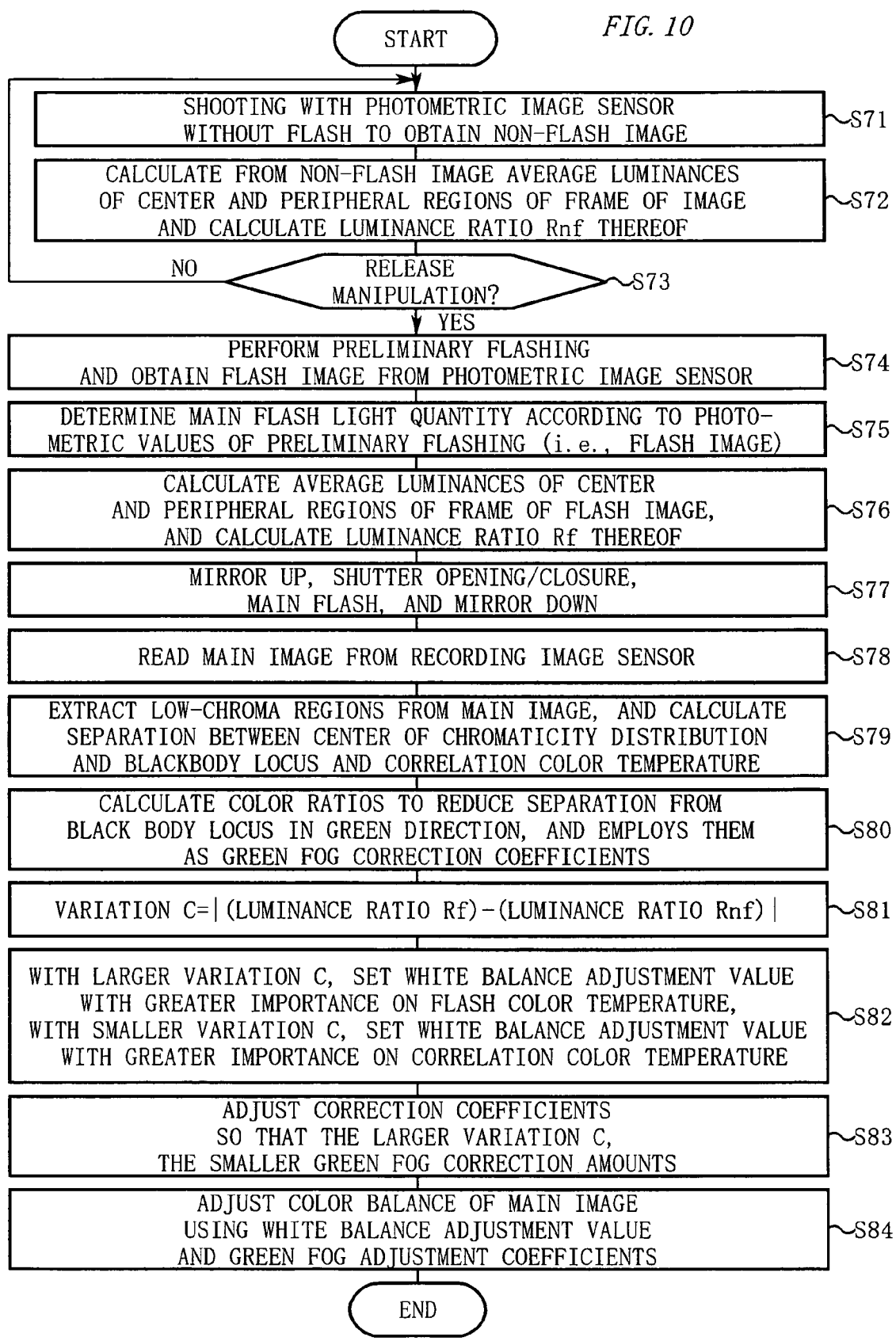
FIG. 10 is a flowchart showing the operation of a fourth embodiment.

FIG. 10 is a flowchart showing the operation of the fourth embodiment. The operation of the electronic camera 11 will be described below in order of step numbers shown in FIG. 10.

[Steps S71 and S72] Steps S71 and S72 are the same as steps S51 and S52 of the third embodiment.

[Step S73] The microprocessor 29 judges whether the release button 29a has been pressed fully.

If the release button 29a has been pressed fully, the microprocessor 29 moves to step S74.

On the other hand, if the release button 29a has not been pressed fully (i.e., has been half pressed or has not been pressed at all), the microprocessor 29 returns to step S71.

[Step S74] The microprocessor 29 causes the electronic flash device 12 to emit a preliminary flash and acquires a flash image from the photometric image sensor 18.

[Step S75] The microprocessor 29 determines a target light quantity of a main flash on the basis of divisional photometric results of the preliminary flashing (i.e., flash image).

[Step S76] The microprocessor 29 divides the flash image into two, one in a center region of the frame and one in a peripheral region thereof, and calculates average luminance values for the respective regions. And the microprocessor 29 calculates a luminance ratio Rf of the average luminance of the center region to the average luminance of the peripheral region.

[Step S77] Then, microprocessor 29 causes the mirror 15 to jump up and opens the leading blade of the shutter 19a, and thereby starts to project an object image onto the imaging surface of the recording image sensor 19.

In the case of single-shot main flashing, the microprocessor 29 causes the electronic flash device 12 to start a main flash when the shutter 19a has been fully opened. Monitoring the light quantity of the main flash, the electronic flash device 12 stops the main flash at a point of time when the light quantity has reached the target value.

When a preset charge storage time has elapsed, the microprocessor 29 closes the trailing blade of the shutter 19a. After the shutter 19a is fully closed in this manner, the microprocessor 29 lowers the mirror 15.

[Step S78] The microprocessor 29 gives a drive signal to the recording image sensor 19 using the imaging control section 27. The recording image sensor 19 outputs a main image. The main image is digitized on a pixel-by-pixel basis by the A/D conversion section 21 and then stored in the image memory 22 (temporary storage).

[Step S79] The microprocessor 29 accesses the image memory 22 and reads low-chroma regions (i.e., regions where the chroma is lower than a prescribed value) from the flash image. The microprocessor 29 determines chromaticity (R/G and B/G) of each small region (e.g., each pixel) using RGB components in the low-chroma regions, and determines the center of distribution of those sets of chromaticity values. Then, the microprocessor 29 calculates a separation between the distribution center and the black body locus on the chromaticity plane.

Further, the microprocessor 29 detects a correlation color temperature on the black body locus by mapping the distribution center to the black body locus.

[Step S80] The microprocessor 29 calculates color ratios (R gain and B gain) to be used for reducing the separation from the black body locus in the green direction and employs those as green fog correction coefficients.

[Step S81] The microprocessor 29 calculates a preliminary-flash-induced variation C between the luminance ratios Rnf and Rf:

variation $C=|$(luminance ratio $Rf$)−(luminance ratio $Rnf$)$|$.

[Steps S82 and S83] Steps S82 and S83 are the same as steps S62 to S64 of the third embodiment.

Advantages etc. of Fourth Embodiment

As described above, the fourth embodiment can provide the same advantages as the third embodiment does.

Further, in the fourth embodiment, luminance ratios obtained before and after preliminary flashing by using the photometric image sensor 18 are compared with each other. In this case, the number of pixels in both of the flash image and the non-flash image is reduced so that the processing cost that is necessary for the calculations of luminance ratios and a variation C is low, which can make the imaging sequence nimbler.

[5] Supplements to Embodiments

Although the above embodiments are directed to the single-lens electronic camera 11, the invention is not limited to such a case. For example, the invention can also be applied to a compact electronic camera. In this case, it is preferable to pick up a test image or a non-flash image with the recording image sensor. In this configuration, since the photometric image sensor 18 is not necessary, the structure of the imaging section can be simplified.

Although in the above embodiments a single adjustment value is determined for the entire image, the invention is not limited to such a case. A configuration is possible in which the screen is divided into a plurality of regions and adjustment values according to the invention are determined for the respective regions. In this case, the uniformity of an illumination state is judged for each region and a proper adjustment value can be determined for each region according to a result of the uniformity judgment.

Although the above embodiments are directed to the case of using the built-in electronic flash device 12, the invention is not limited to such a case. The invention may be applied to a case of using an external electronic flash device.

Although the above embodiments are directed to the case of performing color adjustments in the electronic camera, the invention is not limited to such a case. For example, a program for performing part of all of the processing shown in FIG. 3, 6, 7, or 10 may be generated. The above-described image processing can be performed on an external computer by executing the program thereon.

In many cases, uneven illumination of flash shooting occur in a situation that a nearby object is bright and a distant background is dark. Therefore, the uniformity of an illumination state can be judged lower as the brightness difference (e.g., the standard deviation of a luminance distribution) of an image picked up with flash increases.

In particular, the uniformity of illumination becomes much low when the ratio of ambient light to a flash is small. In view of this, it is preferable to employ, as an index of the non-uniformity of illumination, a value obtained by dividing the standard deviation of a luminance distribution by the luminance. With this index, the degree of non-uniformity lowers as the ambient light becomes brighter even if the brightness difference of an image (i.e., the standard deviation of a luminance distribution) is the same. That is, the degree of non-uniformity is low if objects are brightly illuminated with ambient light and the luminance is high on average as in the case of synchronized shooting during the daytime. Conversely, the degree of non-uniformity is high if the luminance is low on average as in the case of flash shooting in darkness.

The expanse of color fogs in an image can also be judged on the basis of results of such a judgment of the uniformity of illumination and the detection of color fogs.

In the above embodiments, a main image for histogram comparison may be picked up separately from a main image for recording. In this case, the main image for histogram comparison may be a low-resolution image. For example, a low-resolution main image may be read from the photometric image sensor 18 with pre-flashing of the electronic flash device 12. Alternatively, a low-resolution main image may be read out by driving the recording image sensor 19 in a draft mode (thinned-out reading mode) with pre-flashing of the electronic flash device 12.

Although both of white saturation and black saturation are detected in the first embodiment, the invention is not limited to such a case. The judgment of the uniformity of flash illumination may be canceled when a high frequency of white or black saturation is detected. Further, a gradation range corresponding to a frequency of white or black saturation in a main image may be detected from the white side or black side of a histogram distribution of a test image. In this case, a detected gradation range may be removed from the histogram distribution of the test image (the highest and/or lowest gradation range is removed) or a plurality of detected gradation ranges may be combined into a single gradation range. Modifying a histogram distribution of a test image in this manner makes the histogram comparison more accurate. This operation makes it possible to judge the uniformity of flash illumination accurately irrespective of occurrence of white or black saturation in a main image.

In the third and fourth embodiments, the variation C is determined by obtaining the difference (absolute value) between luminance ratios Rnf and Rf. However, the invention is not limited to such a case. For example, it may be determined by obtaining a ratio between luminance ratios Rnf and Rf (e.g., Rf/Rnf).

In the third and fourth embodiments, a luminance ratio between luminance of a center region of a frame and luminance of a peripheral region thereof is determined. However, the invention is not limited thereto; a luminance ratio may be determined between luminance values of any different regions of a frame of an image. For example, a luminance ratio may be between luminance of a vicinity of a selected AF area and luminance of any other region. Alternatively, it may be determined between luminance of a center region of the frame and luminance of the entire frame.

The invention is not limited to the above embodiments and various modifications may be made without departing from the spirit and scope of the invention. Any improvement may be made in part or all of the components.

What is claimed is:

1. An electronic camera comprising:
   an imaging section capturing an image of an object;
   an imaging control section generating a test image and a main image by controlling said imaging section, the test image being captured without a flash, the main image being captured with a flash;
   a histogram calculating section calculating a histogram distribution for each of the test image and the main image;
   a histogram correlation judging section judging correlation between two histogram distributions calculated by said histogram calculating section;
   a white balance calculating section determining a white balance adjustment value, placing importance on a color temperature of a flash, when judging that a flash has not illuminated an object evenly according to a histogram correlation judging section's judgment that the correlation is low, and determining a white balance adjustment value, placing importance on a color temperature of the main image, when judging that a flash has illuminated an object evenly or a flash has not reached an object evenly according to a histogram correlation judging section's judgment that the correlation is high; and
   a white balance adjusting section adjusts a white balance of the main image in accordance with the white balance adjustment value determined by said white balance calculating section.

2. The electronic camera according to claim 1, wherein said white balance calculating section calculates a weighted combination value of a first white balance adjustment value and a second white balance adjustment value as the white balance adjustment value, and increases a weight of the first white balance adjustment value when the correlation is low and increases a weight of the second white balance adjustment value when the correlation is high, the first white balance adjustment value being determined with reference to the color temperature of the flash, the second white balance adjustment value being determined with reference to the color temperature of the main image.

3. The electronic camera according to claim 1, wherein said white balance calculating section determines a frequency of white saturation and/or black saturation in the main image, and refrains from judging evenness of the flash illumination if the frequency is higher than a predetermined threshold value.

4. The electronic camera according to claim 1, wherein said imaging section further comprises a photometric image sensor performing an imaging operation for divisional photometry and a recording image sensor performing an imaging operation for recording, wherein said imaging control section captures the test image without a flash by controlling said photometric image sensor and captures the main image with a flash by controlling said recording image sensor.

5. The electronic camera according to claim 4, wherein said histogram calculating section reduces a difference between the two histogram distributions due to a device difference between said photometric image sensor and said recording image sensor.

6. The electronic camera according to claim 1, wherein said histogram correlation judging section detects correlation between the two histogram distributions generated by the histogram calculating section after removing frequencies lower than a predetermined frequency from the two histogram distributions.

7. An electronic camera comprising:
   an imaging section capturing an image of an object;
   an imaging control section generating a test image and a main image by controlling said imaging section, the test image being captured without a flash, the main image being captured with a flash;
   a histogram calculating section generating a histogram distribution for each of the test image and the main image;
   a histogram correlation judging section judging correlation between two histogram distributions generated by said histogram calculating section;
   a special light source determining section detecting a green fog due to illumination by a fluorescent lamp, upon determining that chromaticity of a low-chroma region in the main image is separated from a black body locus; and
   a color balance adjusting section correcting a green fog by increasing red and blue components of the main image relatively to a green component thereof when judging that the fluorescent lamp illumination is even according to a histogram correlation judging section's judgment that the histogram correlation is high and to the special light source determining section's detection of the green fog in the low-chroma region, and decreasing the green fog correction when judging that the fluorescent lamp illumination is not even according to a histogram correlation judging section's judgment that the histogram correlation is low and to the special light source determining section's detection of the green fog in the low-chroma region.

8. The electronic camera according to claim 7, wherein said color balance adjusting section calculates a weighted combination value of a white balance adjustment value and a color balance adjustment value if the histogram correlation is judged low and a green fog is detected, and adjusts a color balance of the main image by using the weighted combination value, the white balance adjustment value being determined with reference to a correlation color temperature of the main image which is obtained by mapping to the black body locus, the color balance adjustment value being for correction of the green fog.

9. The electronic camera according to claim 8, wherein for the calculation of the weighted combination value said color balance adjusting section decreases the weight of the color balance adjustment as the histogram correlation lowers.

10. The electronic camera according to claim 7, wherein said color balance adjusting section prepares predetermined, plural sets of data on correspondence between a color of a low-chroma region and a color balance adjustment value in accordance with kinds of color rendering performance of fluorescent lamps, calculates a color balance adjustment value by using a set of data for higher color rendering performance as the histogram correlation lowers, and adjusts a color balance of the main image according to the calculated color balance adjustment value.

11. An electronic camera comprising:
an imaging section generating an image by shooting an object;
a special light source determining section detecting a color fog caused by a special light source by determining that chromaticity of a low-chroma region in the image is separate from a black body locus;
an even illumination judging section judging evenness of illumination to the image; and
a color balance adjusting section correcting a color fog in such a manner as to reduce a separation of chromaticity of the image from the black body locus if the illumination to the image is judged even and the color fog is detected in said low-chroma region, and decreasing the color fog correction if the illumination to the image is judged uneven and the color fog is detected in said low-chroma region.

12. An electronic camera comprising:
an image acquiring section acquiring a non-flash image and a flash image by controlling a flash device, the non-flash image being captured without a flash, the flash image being captured with a flash;
a luminance ratio detecting section determining a ratio of luminance Rnf of different regions A and B of a frame of the non-flash image, determining a ratio of luminance Rf of the different regions A and B of a frame of the flash image, and calculating a flash-induced variation C between the luminance ratios Rnf and Rf; and
a color balance adjusting section setting a color balance adjustment in such a manner that the larger the variation C is, the greater importance placed on a color temperature of the flash is, and performing a set color balance adjustment on a main image that is captured with a flash.

13. The electronic camera according to claim 12, wherein said luminance ratio detecting section determines a ratio of luminance Rnf between a center region of a frame of the non-flash image and a whole frame or a peripheral region of the frame thereof, and determines a ratio of luminance Rf between a center region of a frame of the flash image and a whole frame or a peripheral region of the frame thereof.

14. The electronic camera according to claim 12, wherein said color balance adjusting section sets a color balance adjustment in such a manner that the smaller the variation C is, the greater importance placed on a color temperature of the main image or the flash image is, and performs a set color balance adjustment on the main image.

15. The electronic camera according to claim 12, wherein said color balance adjusting section decreases green fog correction amount in the color balance adjustment as the variation C increases, the green fog correction amount being for increasing red and blue components relatively to a green component.

16. The electronic camera according to claim 12, wherein said image acquiring section comprises: an auxiliary image sensor capturing the non-flash image in a state that the flash device is not flashing; and a main image sensor capturing the flash image in a state that the flash device is flashing, the flash image also serving as the main image.

17. The electronic camera according to claim 12, wherein said image acquiring section comprises an auxiliary image sensor capturing the non-flash image before or after the flash device emits a preliminary flash and capturing the flash image while the flash device is emitting a preliminary flash, and a main image sensor capturing the main image in a state that the flash device is emitting a main flash.

18. A computer-readable medium storing a program that, when executed, causes a computer to function as said histogram calculating section, said histogram correlation judging section, said white balance calculating section, and said white balance adjusting section that are recited in claim 1.

19. A computer-readable medium storing a program that, when executed, causes a computer to function as said histogram calculating section, said histogram correlation judging section, said special light source determining section, and said color balance adjusting section that are recited in claim 7.

20. A computer-readable medium storing a program that, when executed, causes a computer to function as said special light source determining section, said even illumination judging section, and said color balance adjusting section that are recited in claim 11.

21. A computer-readable medium storing a program that, when executed, causes a computer to function as said luminance ratio detecting section and said color balance adjusting section that are recited in claim 12.

* * * * *